(12) United States Patent
Gysling

(10) Patent No.: US 8,286,466 B2
(45) Date of Patent: Oct. 16, 2012

(54) METHOD AND APPARATUS FOR MAKING A WATER CUT DETERMINATION USING A SEQUESTERED LIQUID-CONTINUOUS STREAM

(75) Inventor: Daniel L. Gysling, Glastonbury, CT (US)

(73) Assignee: Expro Meters, Inc., Wallingford, CT (US)

( * ) Notice: Subject to any disclaimer, the term of this patent is extended or adjusted under 35 U.S.C. 154(b) by 561 days.

(21) Appl. No.: 12/479,303

(22) Filed: Jun. 5, 2009

(65) Prior Publication Data

US 2009/0306911 A1    Dec. 10, 2009

Related U.S. Application Data

(60) Provisional application No. 61/058,936, filed on Jun. 5, 2008.

(51) Int. Cl.
G01N 29/02 (2006.01)
G01N 29/22 (2006.01)
(52) U.S. Cl. .................................................. 73/61.45
(58) Field of Classification Search .............. 73/61.41, 73/61.44, 61.45, 861.04, 861.42
See application file for complete search history.

(56) References Cited

U.S. PATENT DOCUMENTS

| | | | | |
|---|---|---|---|---|
| 4,048,854 A | * | 9/1977 | Herzl | .......................... 73/861.02 |
| 4,388,127 A | | 6/1983 | Brunner et al. | |
| 4,556,813 A | | 12/1985 | Baumoel | |
| 4,598,583 A | | 7/1986 | Steinhauser | |
| 4,735,097 A | | 4/1988 | Lynnworth | |
| 4,788,852 A | * | 12/1988 | Martin et al. | ................. 73/61.44 |
| 5,083,452 A | | 1/1992 | Hope | |
| 5,131,279 A | | 7/1992 | Lang et al. | |
| 5,351,521 A | * | 10/1994 | Cracknell | ...................... 73/19.1 |
| 6,178,827 B1 | | 1/2001 | Feller | |
| 6,265,713 B1 | * | 7/2001 | Berard et al. | .............. 250/269.3 |
| 6,354,146 B1 | | 3/2002 | Birchak et al. | |
| 6,405,604 B1 | * | 6/2002 | Berard et al. | .............. 73/861.63 |
| 6,443,226 B1 | | 9/2002 | Diener et al. | |
| 6,481,288 B1 | | 11/2002 | Humphrey et al. | |
| 6,526,838 B1 | | 3/2003 | Froelich et al. | |
| 6,550,345 B1 | | 4/2003 | Letton | |
| 6,575,043 B1 | | 6/2003 | Huang et al. | |

(Continued)

FOREIGN PATENT DOCUMENTS

DE    4306119    9/1994

(Continued)

Primary Examiner — Daniel Larkin
(74) Attorney, Agent, or Firm — O'Shea Getz P.C.

(57) ABSTRACT

An apparatus and method for determining the water cut value of a multiphase fluid flowing within a pipe is provided. The device includes a sequestering structure disposed within the pipe, a transmitting device, a receiving device, and a processing device. The sequestering structure at least partially defines a sensing passage within the pipe, which passage has a gap extending substantially normal to a direction of fluid flow within the pipe. The sensing passage is oriented to sequester an amount of a liquid component of the multi-phase fluid sufficient to form a continuous liquid body extending across the gap of the sensing passage. The transmitting device is operable to transmit a signal through the liquid across the gap of the sensing passage. The receiving device is operable to receive the signal after it has traversed the liquid within the sensing passage, and create sensor data. The processing device is in communication with at least the receiving device to receive and process the sensor data to determine the water cut value of the liquid.

32 Claims, 9 Drawing Sheets

U.S. PATENT DOCUMENTS

| | | |
|---|---|---|
| 6,626,049 B1 | 9/2003 | Ao |
| 6,634,239 B2 | 10/2003 | Gomm et al. |
| 6,732,575 B2 | 5/2004 | Gysling et al. |
| 7,086,278 B2 | 8/2006 | Gysling et al. |
| 7,096,719 B2 | 8/2006 | Gysling |
| 7,152,460 B2 | 12/2006 | Gysling et al. |
| 7,165,464 B2 | 1/2007 | Gysling et al. |
| 7,171,315 B2 | 1/2007 | Loose |
| 7,261,002 B1 | 8/2007 | Gysling et al. |
| 7,322,245 B2 | 1/2008 | Gysling et al. |
| 7,328,624 B2 | 2/2008 | Gysling et al. |
| 7,331,233 B2 | 2/2008 | Scott |
| 7,364,240 B2 | 4/2008 | Seely |
| 7,367,240 B2 | 5/2008 | Gysling et al. |
| 7,380,438 B2 | 6/2008 | Gysling et al. |
| 7,380,439 B2 | 6/2008 | Gysling et al. |
| 7,389,187 B2 | 6/2008 | Kersey et al. |
| 7,418,877 B2 | 9/2008 | Gysling |
| 7,426,852 B1 | 9/2008 | Rothman |
| 7,437,946 B2 | 10/2008 | Gysling |
| 7,526,966 B2 | 5/2009 | Gysling et al. |
| 7,587,948 B2 | 9/2009 | Gysling et al. |
| 2008/0098818 A1 | 5/2008 | Fernald et al. |
| 2008/0208483 A1 | 8/2008 | Loose et al. |
| 2009/0025487 A1 | 1/2009 | Gysling et al. |
| 2009/0044636 A1 | 2/2009 | Hope |
| 2009/0158858 A1 | 6/2009 | Gysling et al. |

FOREIGN PATENT DOCUMENTS

| | | | |
|---|---|---|---|
| GB | 2210169 | | 6/1989 |
| GB | 2430493 | * | 3/2007 |
| WO | 9314382 | | 7/1993 |
| WO | WO 94/25859 | * | 11/1994 |
| WO | WO 2006/094669 | * | 9/2006 |
| WO | WO 2007/105961 | * | 9/2007 |

* cited by examiner

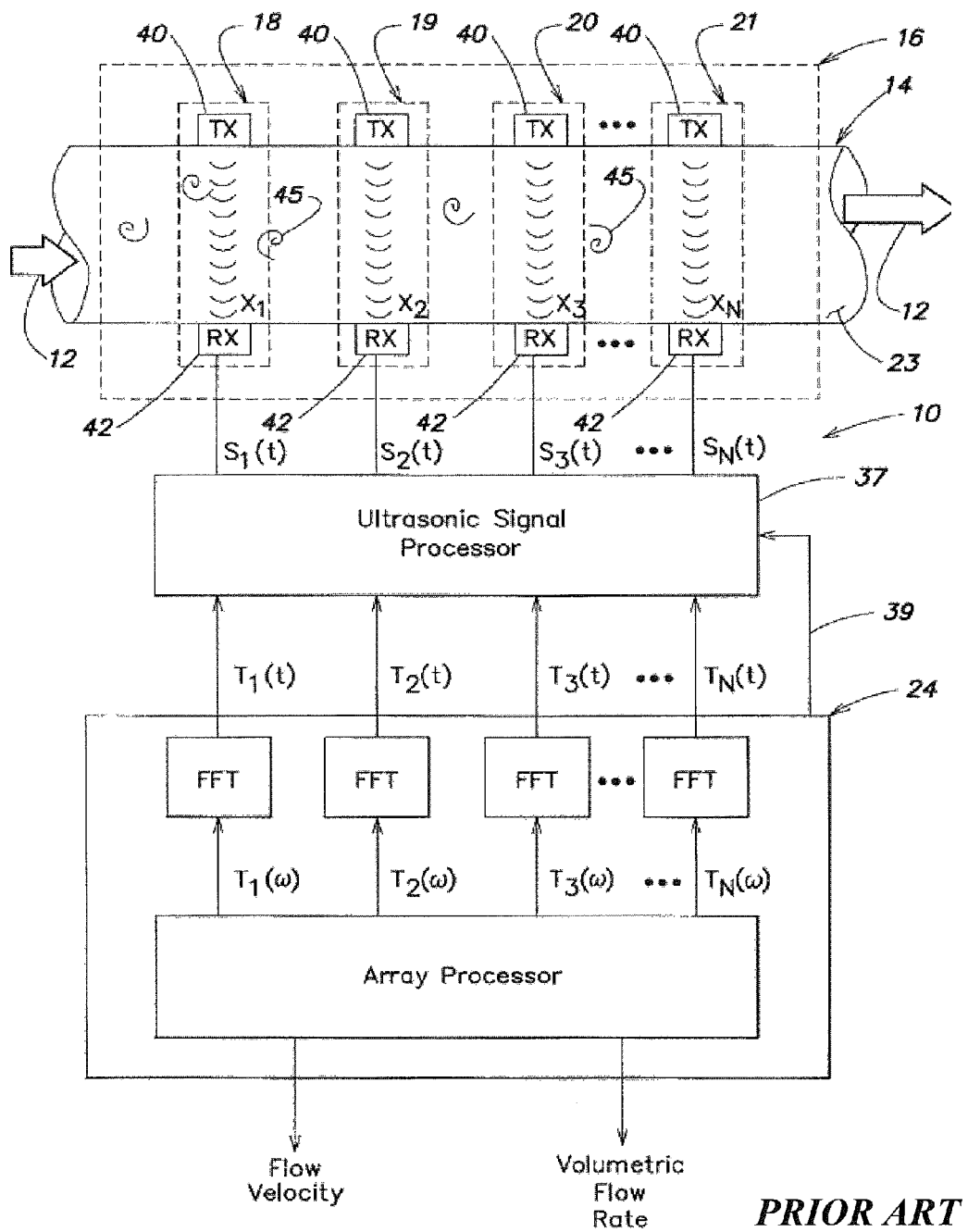
FIG. 1   *PRIOR ART*

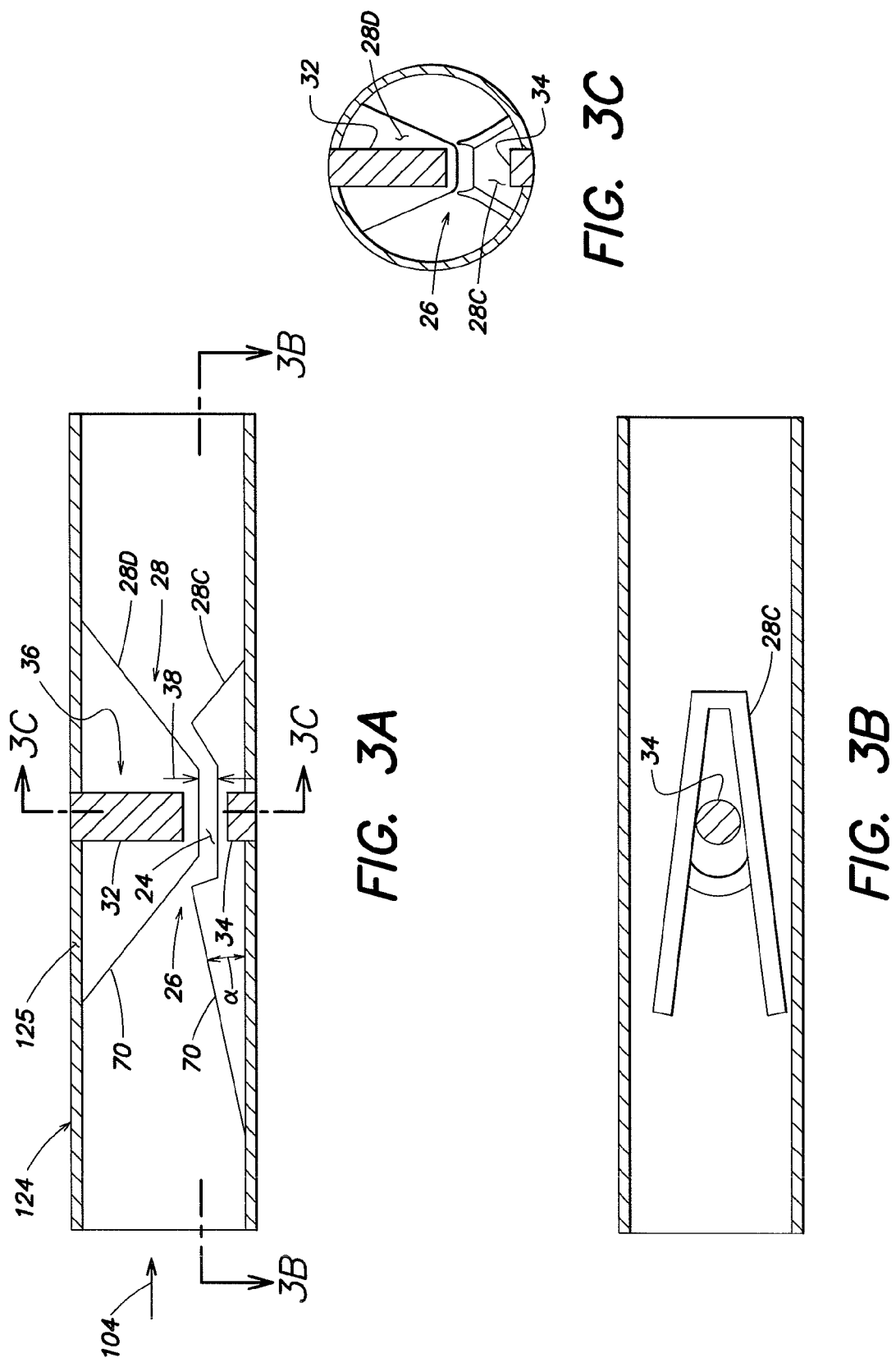

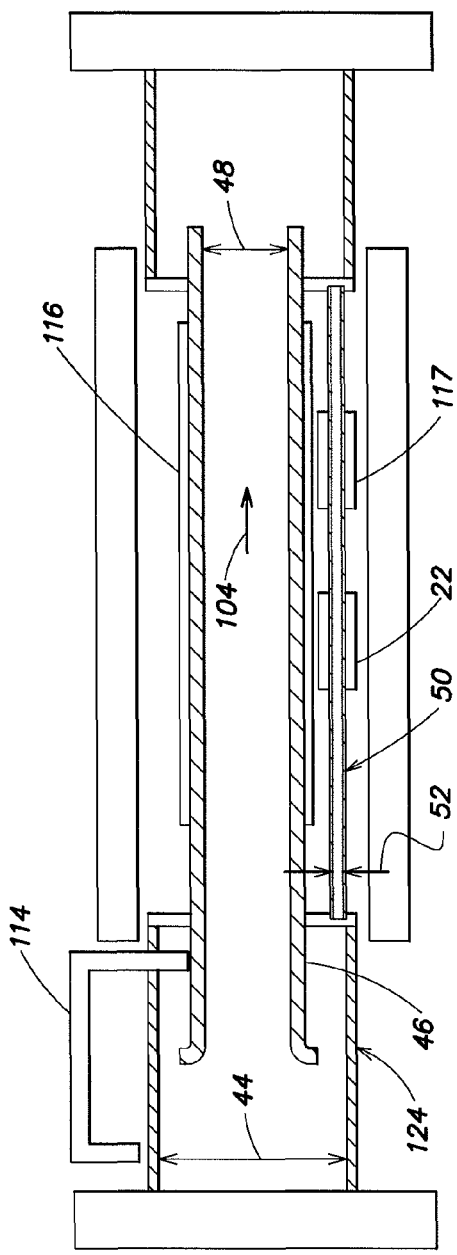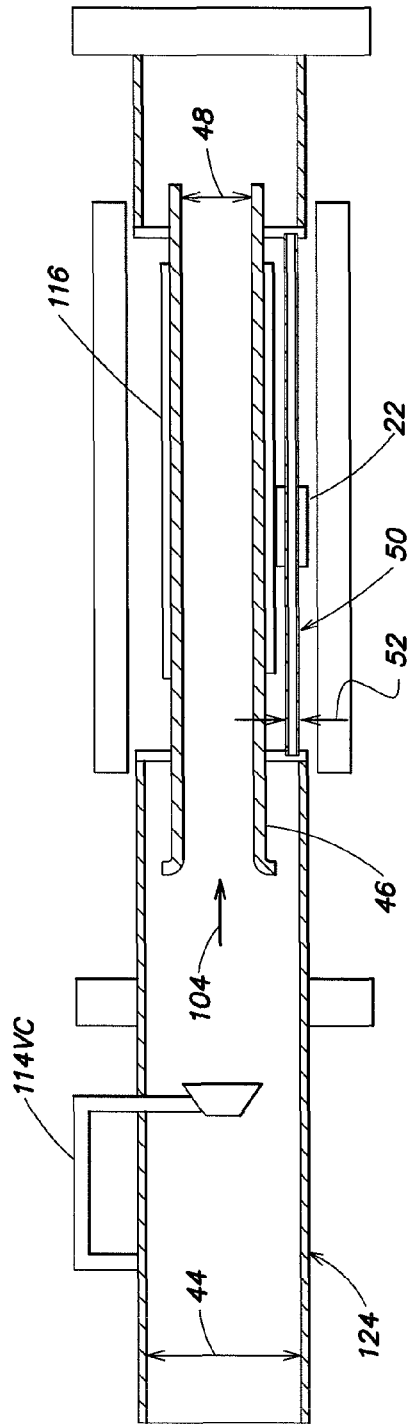

METHOD AND APPARATUS FOR MAKING A WATER CUT DETERMINATION USING A SEQUESTERED LIQUID-CONTINUOUS STREAM

This application claims the benefit of U.S. Provisional Patent Application Ser. No. 61/058,936, filed Jun. 5, 2008.

BACKGROUND OF THE INVENTION

1. Technical Field

This invention relates generally to methods and apparatus for measuring the composition, velocity and volumetric flow rate of a multi-phase fluid flow (e.g., oil, water, and gas mixture), and more particularly to methods and apparatus for measuring the liquid component portion of a multi-phase fluid flow.

2. Background Information

Currently, there is an unmet need for cost-effective multi-phase fluid flow measurement in oil and gas production. Oil wells very often produce widely varying amounts of oil, water and gas and thus, exhibit a wide range of multi-phase flow patterns. To obtain accurate measurements of the fluid flow mixture, current methods typically separate the produced fluid into component phases prior to measurement. For example, producers have historically relied on three-phase separators to divide the production streams into single-phase oil, water and gas streams for measurement using conventional, single-phase flow meters. Although generally effective, three-phase separators have several undesirable properties that have driven the industry to seek alternative solutions, including size, cost and limited turndown ratios. Recently, advancement of online water cut and gas/liquid separation technology has enabled the industry to consider compact approaches based on two-phase separation. In these systems, the fluid flow is separated into a gas component flow and liquid component flow for measurement and the net oil is determined by measuring the liquid rate and water cut of the liquid component flow. Most of these systems strive to completely separate all of the liquid into the liquid component stream (as opposed to capturing only a portion of the liquid component flow), and all of the gas into the gas component flow.

One of the difficulties in measuring the composition of a fluid flow at a well head is that the pipe is often not completely and continuously filled with liquid; e.g., the gas void fraction may randomly vary from 0% to 100% of the flow. Currently available apparatus for measuring the water cut has difficulty or is unable to accurately measure the water cut of the fluid due to factors such as intermittent liquid flow.

What is needed is a cost effective apparatus and method for multi-phase fluid flow measurement in oil and gas production, and one that is operable to determine the water cut of a fluid flowing within a pipe under variable flow conditions, including flow conditions of less than 100% liquid within the pipe.

SUMMARY OF THE INVENTION

According to an aspect of the present invention, an apparatus for determining the water cut value of a multiphase fluid flow within a pipe is provided. The term "pipe" as used herein is defined as a conduit or duct operable to contain a fluid flow, and is not therefore limited to a cylindrical cross section conduit typically referred to as a "pipe". The device includes a sequestering structure disposed within an internal passage of the pipe, a transmitting device, a receiving device, and a processing device. The sequestering structure extends out from a wall section of the pipe into the internal passage of the pipe. The structure at least partially defines a sensing passage within the internal pipe, which sensing passage has a gap extending substantially normal to a direction of fluid flow within the pipe. The sensing passage gap is less than the shortest distance across the internal passage of the pipe. The sensing passage is oriented to sequester an amount of a liquid component of the multi-phase flow sufficient to form a continuous liquid body (which may include entrained bubbles) extending across the gap of the sensing passage. The transmitting device is operable to transmit a signal through the liquid across the gap of the sensing passage. The receiving device is operable to receive the signal after it has traversed the liquid within the sensing passage, and create sensor data. The processing device is in communication with at least the receiving device to receive and process the sensor data to determine the time required for the ultrasonic wave to propagate across the fluid filled gap and then to determine the water cut value of the liquid.

According to another aspect of the present invention, a method for determining the water cut value of a multiphase fluid flowing within an internal passage of a pipe is provided. The method includes the steps of: 1) sequestering a stream of a liquid component of the multi-phase fluid sufficient to form a continuous liquid body across a gap of a sensing passage disposed within the internal passage of the pipe, which sensing passage is formed at least in part by a sequestering structure extending out from a wall of the pipe into the internal passage of the pipe, and which sensing passage gap extends substantially normal to a direction of fluid flow within the pipe; 2) transmitting a signal through the liquid across the gap of the sensing passage; 3) receiving the signal after it has traversed the liquid within the sensing passage, and creating sensor data using the signal; and 4) processing the sensor data to determine the water cut value of the liquid. The sensing passage gap is less than the shortest distance across the internal passage of the pipe.

One of the advantages provided by the present system and method is that it enables a water cut determination in a high variability fluid flow such as those typically found in oil well applications. The apparatus sequesters an amount of the fluid flow sufficient for sensing across a sensing passage, and does not require a liquid continuous body across the entire pipe; i.e., the apparatus does not require constant or slugging flow, one in which a liquid continuous body fills a cross-sectional area of the internal passage of the pipe. In many instances, the fluid flow within a pipe will comprise stratified flow containing a liquid component. In such flow regimes, the present invention advantageously sequesters a stream of liquid from the stratified flow sufficient to perform a water cut determination, which stream is substantially less than the amount of fluid flow necessary to fill a cross-sectional area of the pipe.

Another advantage of the present invention is that it provides an apparatus and method that facilitates isolating and/or distinguishing unwanted structural borne components of a signal from desirable fluid borne components. In applications where a water cut device is clamped on to a pipe and a signal is transmitted through the pipe wall and across the full diameter of the pipe, the transmitted signal will include both a fluid borne component that traverses the liquid within the pipe, and a structural borne component that travels within the pipe wall. As a result, it is necessary to distinguish between the fluid borne component (which provides information regarding the fluid) and the unwanted structural borne component (which does not provide information regarding the fluid). The present invention addresses this issue by providing one or more sequestering structure members that act as wave guides. Speaking in terms of a compression waveform mode of the signal, the sequestering structure members provide a first path between a transmitting device and a receiving device that can be traversed by the compression waveform mode of the signal in less time than would take the compression waveform mode of the signal to traverse a second path from the transmitting device to the receiving device by propagating within the pipe wall, around the circumference of the pipe. As a result, the task of determining the arrival time of the fluid borne component is simplified, and so too the task of determining the speed of sound within the liquid.

The signal processing advantages provided by the sequestering structure of the present invention are not limited to the speed at which the signal may be received, however. The sequestering structure also facilitates signal processing by decreasing the amount of the signal converted into less desirable waveform modes. For example, in an application where a water cut device is clamped on to a pipe and a signal is transmitted through the pipe wall and across the full diameter of the pipe, a significant portion of the transmitted signal wave transferred to the fluid is converted from a compression waveform to another waveform (e.g., a shear waveform) at the interface between the fluid within the pipe and the pipe wall. The shear waveform is less desirable than the original compression waveform from a signal processing standpoint. This is particularly true in those multi-phase applications where the fluid flow may vary from complete liquid to complete gas (and all the multi-phase combinations therebetween) and the consequent byproduct of signal variability in shear and other waveform modes. The sequestering structure acts as a waveguide that facilitates the transmission of the compression wave of the signal into and through at least a portion of the internal passage of the pipe, and subsequently into the sequestered liquid. As a result, substantially less of the compression wave is converted into undesirable wavemodes (e.g., shear) traveling through either the fluid or the pipe wall.

Another advantage of the present invention is that it permits the liquid component of the fluid flow to be sensed across a much shorter distance than across the entire pipe diameter. As a result, the signal experiences less attenuation while in the fluid and is easier to process.

The foregoing and other objects, features and advantages of the present invention will become more apparent in light of the following drawings and detailed description of the present invention.

BRIEF DESCRIPTION OF THE DRAWINGS

Referring now to the drawings, the foregoing and other features and advantages of the present invention will be more fully understood from the following detailed description of illustrative embodiments, taken in conjunction with the accompanying drawings in which like elements are numbered alike.

FIG. 1 is a schematic diagram of a flow meter having an array of ultrasonic sensor units disposed axially along a pipe for measuring the volumetric flow of the fluid flowing in the pipe.

FIG. 3A is a diagrammatic sectional planar view of a three-phase metering device including a sequestering structure.

FIG. 3B is a diagrammatic sectional top view of the device shown in FIG. 3A.

FIG. 3C is a diagrammatic sectional end view of the device shown in FIG. 3A.

FIG. 6 is a diagrammatic sectional planar view of a three-phase metering device embodiment including a bypass section.

FIG. 7 is a diagrammatic sectional planar view of a three-phase metering device embodiment including a bypass section.

DETAILED DESCRIPTION OF THE INVENTION

Figure 2A:
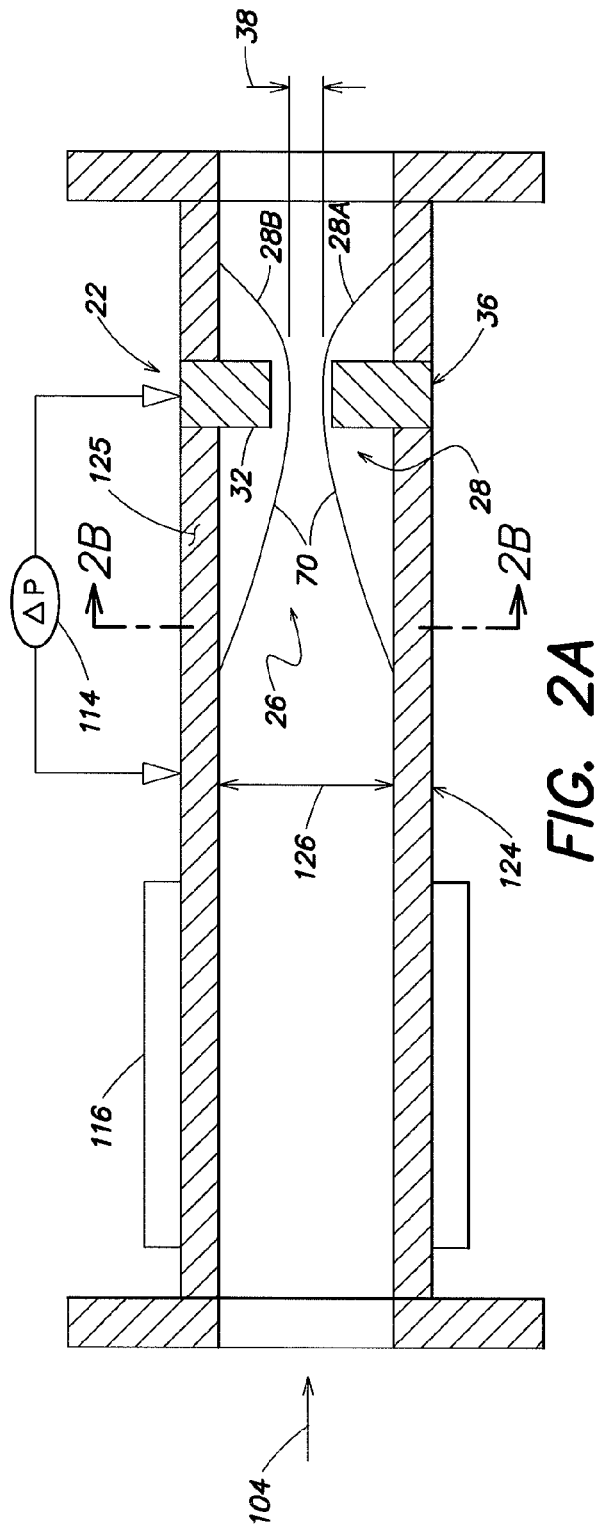
FIG. 2A is a diagrammatic sectional planar view of a three-phase metering device including a sequestering structure.

The present invention provides a method and apparatus for measuring multi-phase fluid flows. The present invention is described herein as measuring fluid flow within a "pipe" to facilitate the description. The term "pipe" as used herein is defined to mean a conduit or duct operable to contain a fluid flow, and is not therefore limited to a cylindrical cross section conduit typically referred to as a pipe. Similarly, the term "pipe wall" as used herein refers to the wall that forms at least a part of the conduit or duct operable to contain the fluid flow. The present apparatus includes three-phase metering devices that comprise a flow meter 10, a differential pressure meter 114, and a water cut device 22. The apparatus further includes structure operable to sequester an amount of the liquid component of the fluid flow sufficient to permit determination of the water cut of the liquid, rather than all of the liquid within the fluid flow. The remainder of the fluid flow may include some amount of liquid; e.g., it may be a "wet gas" flow, or any other type of multiphase flow.

The flow meter is operable to determine the volumetric flow rate of the fluid flow within the pipe. Any flow meter that measures a flow property or characteristic that convects with the fluid flow can be used with the present invention. An example of an acceptable fluid flow meter is shown in FIG. 1, and described in U.S. Pat. No. 7,389,187, which is hereby incorporated by reference in its entirety. The exemplary flow meter 10 includes a sensing device 16 comprising an array of ultrasonic sensor units 18-21. Each sensor unit comprises a pair of ultrasonic sensors 40, 42, one of which functions as a transmitter (Tx) 40 and the other as a receiver (Rx) 42. The sensor units 18-21 are spaced axially along the outer surface 23 of a pipe 14 having a process flow 12 propagating therein. Each pair of sensors 40, 42 is diametrically disposed on the pipe at predetermined locations along the pipe to provide a through transmission configuration, such that the sensors transmit and receive an ultrasonic signal that propagates through the fluid substantially orthogonal to the direction of the flow of the fluid within the pipe. Each pair of ultrasonic sensors 40, 42 measures a transit time (i.e., time of flight (TOF), or phase modulation) of an ultrasonic signal propagating through the fluid 12 from the transmitting sensor 40 to the receiving sensor 42. The transit time measurement or variation is indicative of a coherent properties 45 that convect with the flow within the pipe (e.g., vortical disturbances, inhomogenieties within the flow, temperature variations, bubbles, particles, pressure disturbances), which are indicative of the velocity of the process flow 12. An example of the sensors 40, 42 that may be used are Model no. 113-241-591, manufactured by Krautkramer.

In the aforesaid fluid flow meter example, an ultrasonic signal processor 37 fires the sensors 40 in response to a firing signal 39 from the transmitter 24 and receives the ultrasonic output signals $S_1(t)$-$S_N(t)$ from the sensors 42. The signal processor 37 processes the data from each of the sensor units 18-21 to provide an analog or digital output signal $T_1(t)$-$T_N(t)$ indicative of the time of flight or transit time of the ultrasonic signal through the fluid. The signal processor 37 may also provide an output signal indicative of the amplitude (or attenuation) of the ultrasonic signals. One such signal processor is model no. USPC 2100 manufactured by Krautkramer Ultrasonic Systems. The output signals ($T_1(t)$-$T_N(t)$) of the ultrasonic signal processor 37 are provided to the transmitter 24, which processes the transit time measurement data to determine the volumetric flow rate. The volumetric flow rate is determined by multiplying the velocity of the fluid by the cross-sectional area of the pipe.

The above described fluid flow meter is provided as an example of an acceptable fluid flow meter. Fluid flow meters operable to determine the volumetric flow rate of a fluid within a pipe are well known. The present invention is not limited to the example given, and may be used with a variety of different types of such meters. Further examples of acceptable meters can be found in U.S. Pat. Nos. 7,096,719 and 7,165,464, and 7,418,877, each of which is incorporated by reference in its entirety.

The differential pressure based flow meter 114 may include any type of flow meter that enables flow measurement using a differential pressure ($\Delta P$) in the flow 104. For example, the DP flow meter 114 may enable flow measurement by using a flow obstruction or restriction, a venturi meter, an elbow flow meter, a v-cone meter, a pipe constriction, or the like. The DP flow meter may sense a difference in pressure along a length of pipe. The difference in pressure across the obstruction (or length of pipe) may be measured (e.g., using a pair of pressure sensors) and converted into a volumetric flow rate using a processor or secondary device, such as a differential pressure transmitter.

Figure 11:
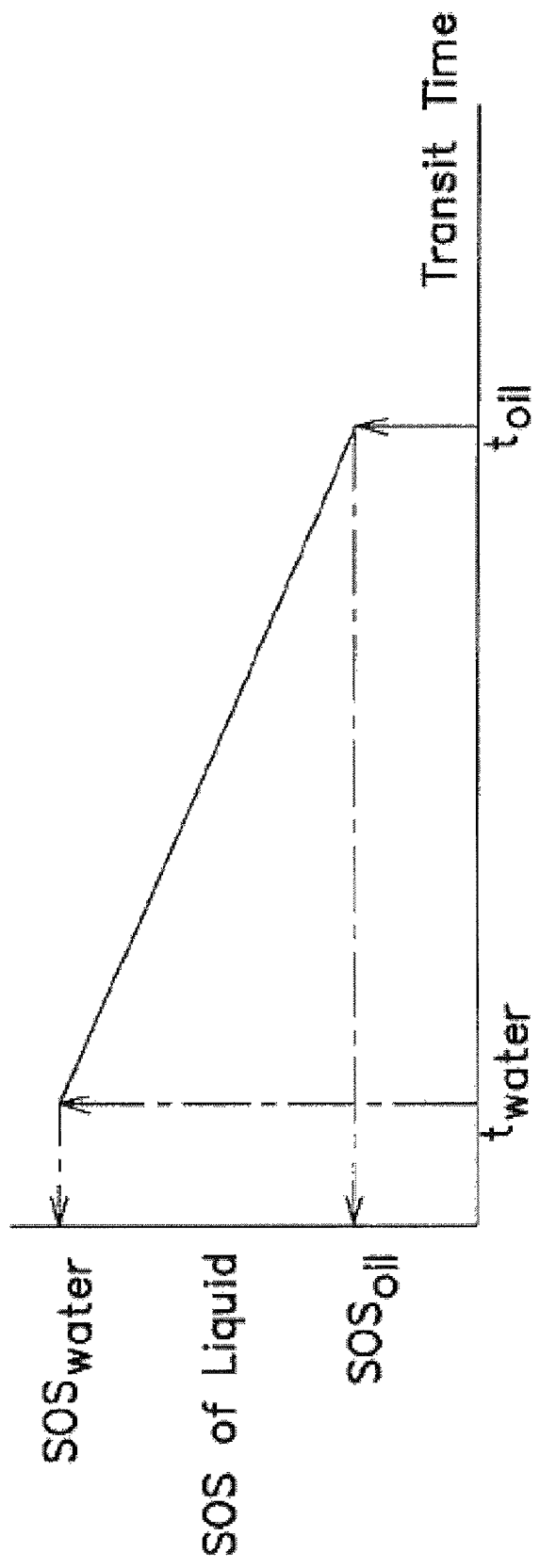
FIG. 11 is a diagrammatic graph illustrating the relationship between speed of sound and transit time of an ultrasonic signal traveling through a distance of oil, water, and mixtures thereof.

Now referring to FIGS. 2A-10 and 12, the water cut value of the liquid component of the fluid flow 104 represents the relative amount of water within the liquid (i.e., mixture of liquid hydrocarbon(s) and water in oil/gas applications), and therefore if the total liquid rate is known then the water cut can be used to determine the volumetric flow rate of the liquid hydrocarbon(s) within the mixture. A preferred method for determining the water cut of the liquid involves the use of an ultrasonic sensor (i.e., a sensor that produces a signal that traverses the fluid flow) to determine the speed of sound of the mixture via the transit time of the signal. The transit time for an ultrasonic signal to propagate across a pipe 124 is given nominally by:

$$\Delta T = \frac{D}{a} \qquad \text{Eqn. 13}$$

where "D" represents a distance (typically the diameter of a pipe) and "a" represents the speed of sound of the mixture. The speed of sound of a two phase mixture can be related to the volumetric phase fraction of the mixture in a variety of different ways (e.g., by mathematical relationship, empirical data structure, etc.) For example, Wood's equation:

$$\frac{1}{\rho_{mix} a_{mix}^2} = \frac{\phi_{oil}}{\rho_{oil} a_{oil}^2} + \frac{\phi_w}{\rho_w a_w^2} \qquad \text{Eqn. 14}$$

$$\rho_{mix} = \rho_{oil} \phi_{oil} + \rho_w \phi_w \qquad \text{Eqn. 15}$$

illustrates a mathematical relationship between the speed of sound of the mixture and the phase fractions, where: $\varnothing_{oil}$ and $\varnothing_W$ represent the phase fraction of oil and water, respectively, within the liquid, $a_{mix}$, $a_{oil}$ and $a_w$ represent the speed of sound within the mixture, oil, and water, respectively, and $\rho_{mix}$, $\rho_{oil}$, and $\rho_w$ represent the density of the mixture, oil, and water, respectively. The present invention is not limited to relating the speed of sound of the mixture to the phase fractions via Wood's equation, however. For example, the relationship between the transit time, the speed of sound, and the distance traversed through the fluid can be related graphically or within a data table. FIG. 11 provides a diagrammatic example of the aforesaid relationship for two phase fluid flow consisting of oil and water. The graph illustrates the specific relationship between speed of sound and transit time for a given traversed distance. This graph is provided to illustrate the relationship. The present invention is not to be limited to this example, however. In addition, the speed of sound may be determined at a plurality of different frequencies to better ascertain the accuracy of the value, since the speed of sound can be influenced by flow characteristics such as entrained gas.

In applications where a water cut device 22 is attached to the pipe 124 and a signal is transmitted through the pipe wall 125 and across the full diameter of the pipe 126, the transmitted signal will include both a fluid borne component that traverses the liquid within the pipe 124, and a structural borne component that travels within the pipe wall 125. As a result, it is necessary to distinguish between the fluid borne component (which provides information regarding the fluid) and the structural borne component (which does not provides information regarding the fluid). In addition to the need to distinguish fluid borne components and structural borne components, prior art applications where the fluid flow is sensed across the entire pipe 124 also suffer from: 1) the need to have a liquid continuous body across the entire pipe cross-section, which may not be present in intermittent flows; and 2) signal attenuation which is a function of the distance traveled by the signal and the alternative properties of the fluid.

The present invention addresses these shortcomings by sequestering a portion of the liquid component of the fluid flow through a sensing passage 24 that is narrow relative to the pipe diameter 126 (or other distance across the pipe internal passage in non-circular pipe embodiments). The distance across the sensing passage 24 that is normal to the fluid flow is referred to as the gap 38. Although the drawings in FIGS. 2A through 5B are not to scale, they illustrate embodiments where the gap 38 is substantially less than one-half the inner diameter of the pipe. The amount of liquid necessary to create a liquid continuous body across the gap 38 of the sensing passage 24 is appreciably less than that required to make a liquid continuous body across the pipe diameter 126.

Figure 2B:
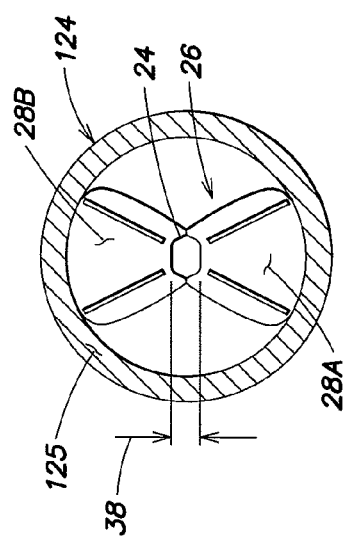
FIG. 2B is a diagrammatic sectional end view of the device shown in FIG. 2A.
Figure 4A:
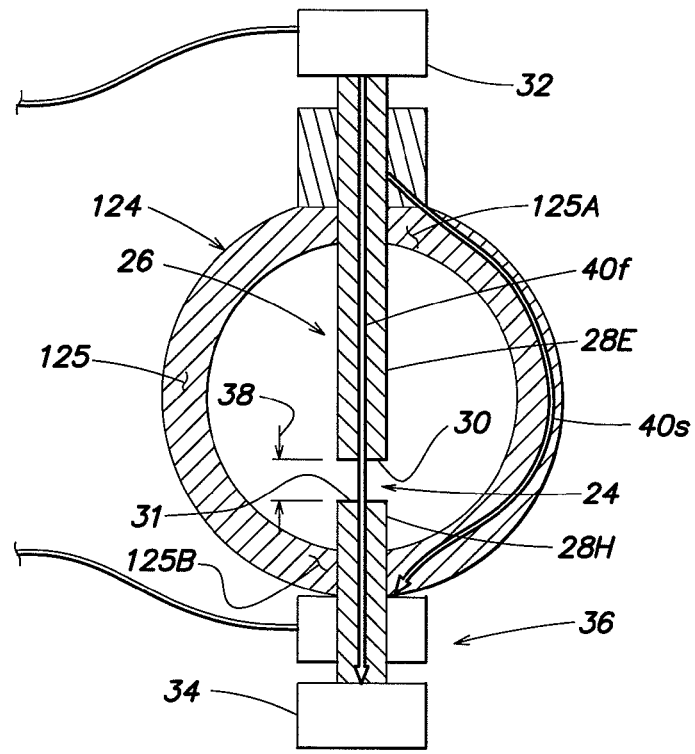
FIG. 4A is a diagrammatic cross-sectional end view of a water cut device including a sequestering structure.
Figure 4B:
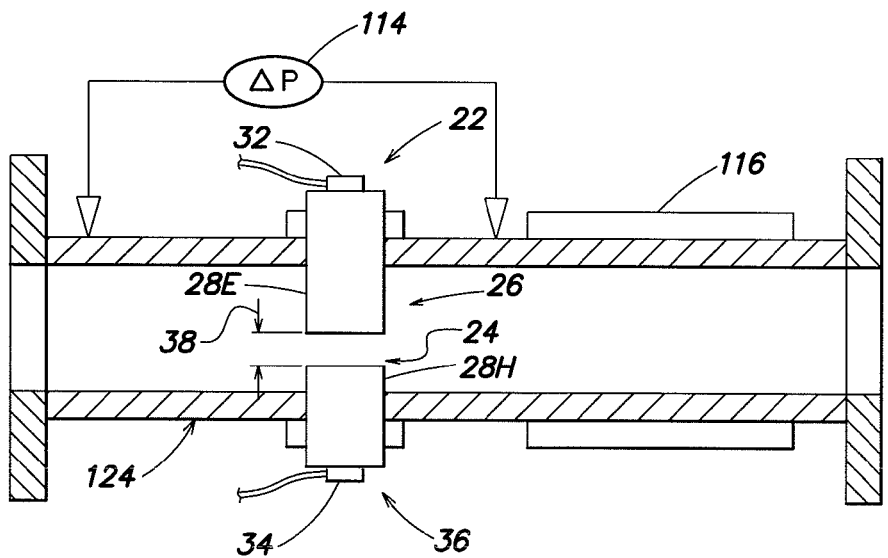
FIG. 4B is a diagrammatic sectional planar view of the device shown in FIG. 4A.
Figure 5A:
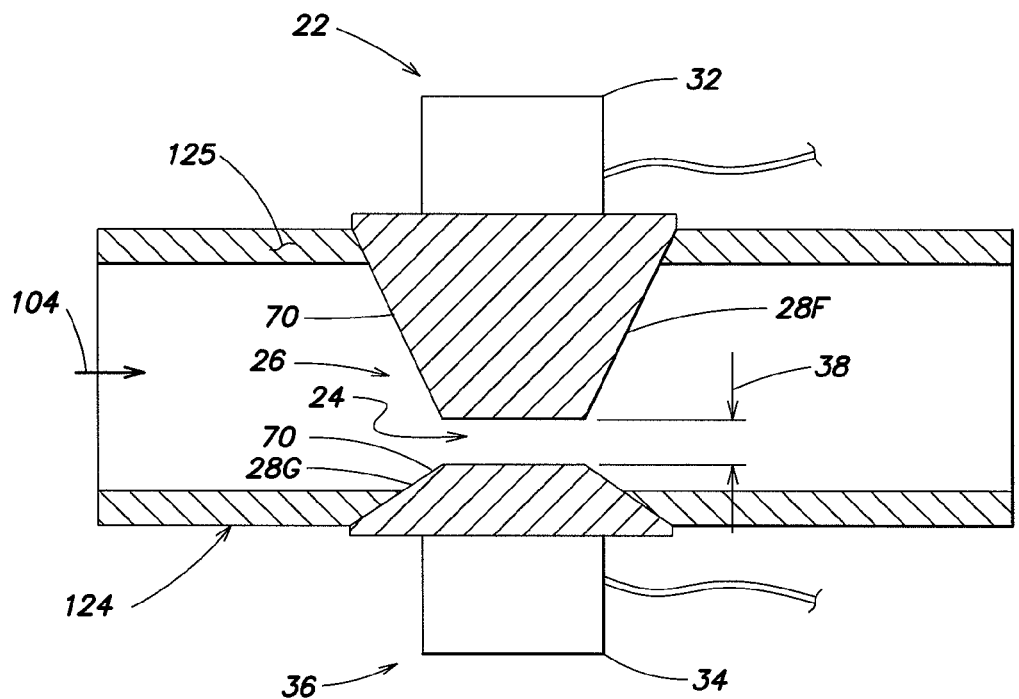
FIG. 5A is a diagrammatic sectional planar view of a water cut device including a sequestering structure.
Figure 5B:
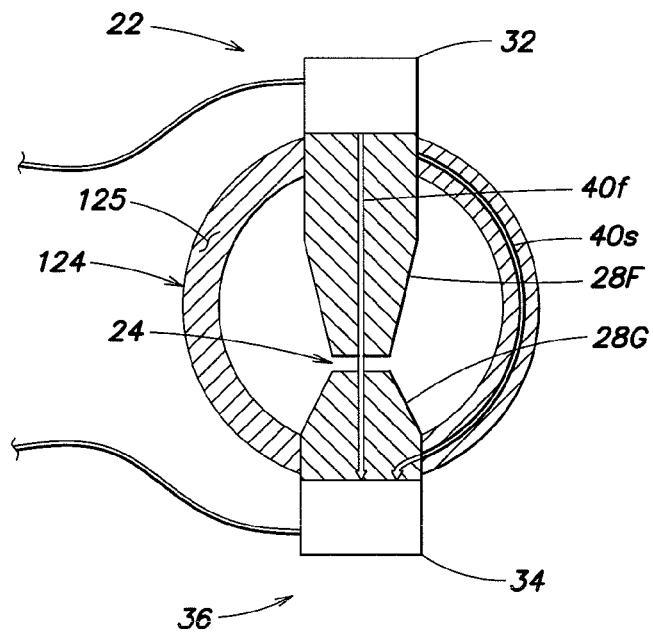
FIG. 5B is a diagrammatic sectional end view of the water cut device shown in FIG. 5A.

In embodiments diagrammatically illustrated in FIGS. 2A-B, 3A-C, 4A-B, and 5A-B, a sequestering structure 26 is disposed within a pipe section, which structure 26 includes at least one member 28 that extends outwardly from a pipe wall 125 to create the passage 24. The sequestering structure member(s) may be secured relative to the pipe 124 using a variety of different techniques; e.g., the members may be welded, epoxied, or otherwise permanently attached to the pipe 124, or they may be removably fastened to the pipe 124 by pipe thread, mechanical fastener, etc., including attachment in a manner that permits positional adjustment of the member. The structure 26 shown in FIGS. 2A and 2B includes a pair of symmetrical ramp-shaped members 28A, 28B that extend outwardly from the pipe wall 125, and toward each other and the center of the pipe 124. The passage 24 is defined by the opposing surfaces of the ramp-shaped members 28A, 28B. FIGS. 3A-C show another example of a sequestering structure 26 that includes a first ramp-shaped member 28C and a second ramp-shaped member 28D. The passage 24 defined by the opposing surfaces of the ramp-shaped members 28C, 28D shown in FIG. 3A follows a non-linear, circuitous path that forms a trough to facilitate the formation of a liquid continuous body within the passage 24. FIGS. 4A-B show an example of a sequestering structure 26 that includes a first member 28E extending out from a pipe wall section 125A toward a second member 28H extending out from the opposing pipe wall section 125B, with the passage 24 being defined by the end surfaces 30, 31 of the sequestering structure members 28E, 28H. An advantage of this embodiment is that the end surfaces are oriented parallel to one another, which orientation promotes well-defined wave arrival signals. In an alternative embodiment, the sequestering structure 26 may include a single member extending out from the pipe walls toward the opposite pipe wall. The single member embodiment may, for example, be formed by inserting a sequestering structure member in an existing port disposed within an existing piping system. In this embodiment, the passage is formed between the end of the member and the pipe wall. FIGS. 5A-B shows an example of a sequestering structure that includes a pair of ramp-shaped members 28F, 28G that extend outwardly from the pipe wall 125 toward each other, and the center of the pipe 124. The end views of the sequestering structures 26 shown in FIGS. 2B and 3C illustrate how the sequestering structures 26 may be shaped to avoid clogging.

Figure 12:
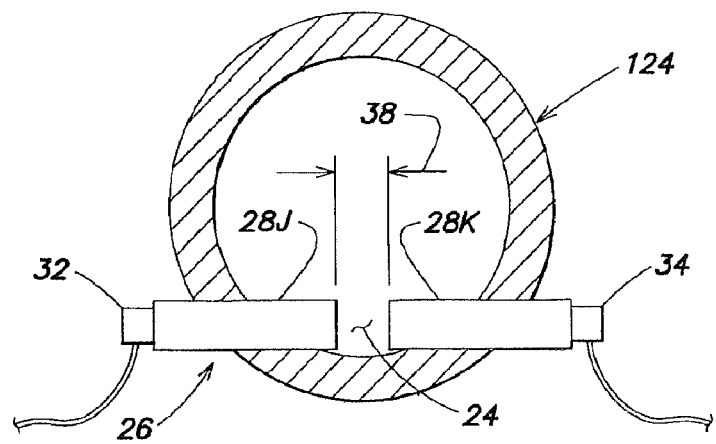
FIG. 12 is a diagrammatic sectional end view of the water cut device.

The embodiments shown in FIGS. 2A-B, 3A-C and 5A-B have sequestering structures 26 that include ramp portions 70 extending between the pipe wall and the passage 24, disposed upstream of the passage 24. The angle of each ramp portion 70 relative to the wall 125 is such that an acute angle α (e.g., see FIG. 3A) is formed between the line of the pipe wall and the ramp portion. The ramp portions 70 leverage the propensity of liquids within the fluid flow 104 to stratify: 1) due to gravity; and 2) adhere to the solid surface of the wall 125 due to surface tension effects; i.e., the ramp portions 70 "collect" the liquid off of the pipe wall 125 and direct it toward the passage 24 where it will create a liquid continuous body across the passage gap 38. FIG. 12 illustrates another sequestering structure 26 embodiment wherein sequestering structure members 28J, 28K are disposed opposite one another in a substantially horizontally disposed pipe section (where horizontal is defined as being perpendicular to a vertical gravity vector). A passage 24 is disposed between the members 28J, 28K. An ultrasonic signal transmitter 32 and receiver 34 are disposed on opposite sides of the passage 24.

In preferred embodiments, each sequestering structure member 28 acts as a waveguide for compression waves (e.g., ultrasonic waves), providing a preferential path for the signal traveling between the (e.g., ultrasonic) transmitter 32 and the receiver 34 of a sensor 36 (i.e., across the gap 38 of the passage 24). As a waveguide, the member 28 preferably either comprises the same material as the pipe 124, or comprises another material that has an acoustic impedance similar to that of the pipe material. FIGS. 4A and 5B diagrammatically illustrate the path of a signal 40 propagating through the waveguide (i.e., that includes the fluid borne component 40f, and a structural borne component 40s of the signal traveling through the pipe wall 125. The shorter path length through the member/waveguide versus circumferentially through the pipe wall 125 ensures that similar signal components 40f traveling through the waveguide will arrive before (i.e., are distinguishable from) other similar signal components 40s traveling through the pipe wall 125 (e.g., compression waves traveling through the member/waveguide vs. compression waves traveling through the pipe wall), and will also be subject to relatively less attenuation. The shorter signal path length consequently enhances the ability of the sensor 36 to collect data from the liquid continuous body within the passage 24; e.g., ensuring that the fluid borne component 40f is the first to arrive greatly simplifies the task of determining the precise arrival time of the fluid borne component 40f and thus simplifies the determination of the propagation velocity of sound within the liquid.

The sequestering structure also facilitates signal processing by decreasing the amount of the signal converted into less desirable waveform modes. As indicated above, in some sensor arrangements a significant portion of the transmitted signal wave transferred to the fluid flow may be converted at the interface between the fluid within the pipe and the pipe wall from a compression waveform to a waveform that is less desirable than the original compression waveform from a signal processing standpoint. The sequestering structure acts as a waveguide that facilitates the transmission of the compression wave of the signal into and through at least a portion of the internal passage of the pipe, and subsequently into the sequestered liquid. As a result, substantially less of the compression wave is converted into an undesirable waveform traveling through either the fluid or the pipe wall.

If the member/waveguide 28 comprises the same material as the pipe wall 125, the maximum gap of the passage 24 permissible to ensure the signal through the member/waveguide 28 arrives first can be determined using the following equation:

$$\frac{\Delta X_{max}}{D} = \frac{\frac{\pi}{2} - 1}{\frac{a_{steel}}{a_{fluid}} - 1} \qquad \text{Eqn. 16}$$

Where $\Delta X_{max}$ is the maximum passage gap 38, D is the diameter of the pipe 124, and $a_{steel}$ and $a_{fluid}$ are the speed of sound values for the fluid and the pipe/waveguide material (e.g., steel), respectively. Equation 16 is an example of an equation operable to define the passage gap 38. Although multiple modes of propagation are likely, Eqn. 16 assumes the signal travels at the velocity of a compression wave, thereby providing a conservative value for $\Delta X_{max}$ (e.g., faster signal speed equates to smaller $\Delta X_{max}$ value). Alternatively, the passage gap 38 value ($\Delta X_{max}$) may be calculated utilizing multiple modes of signal propagation; e.g., Eqn. 17 provides the passage gap in terms of the compression wave and shear wave velocities within the material (e.g., steel) of the pipe wall:

$$\frac{\Delta X_{max}}{D} = \frac{\pi}{2} \frac{\frac{a_{steel_{compression}}}{a_{steel_{shear}}} - 1}{\frac{a_{steel_{compression}}}{a_{fluid}} - 1} \qquad \text{Eqn. 17}$$

If one assumes that a shear wave travels at one-half the velocity of a compression wave traveling within steel, then Eqn. 17 may be simplified to:

$$\frac{\Delta X_{max}}{D} = \frac{\pi - 1}{\frac{a_{steel}}{a_{fluid}} - 1} \qquad \text{Eqn. 18}$$

Again, even if the passage gap 38 (ΔX) exceeds a maximum value determined using Eqn. 16, 17, or 18, benefit is still achieved using the sequestering structure due to reduced undesirable waveform conversion, shorter signal path within fluid, and increased likelihood of a liquid filled passage.

The embodiments shown in FIGS. 2A and 3A-C all include a sensor 36 mounted within the sequestering structure members 28. The embodiments diagrammatically shown in FIGS. 4A-B and 5A-B, in contrast, illustrate an externally mounted sensor 36 coupled with sequestering structure members 28. In the embodiment shown in FIGS. 4A-B, the transmitter 32 is coupled with the first sequestering structure member 28E extending into the pipe 124, and the receiver 34 is coupled with the second sequestering structure member 28H disposed opposite the sequestering structure member 28E. The sequestering structure members 28 diagrammatically shown in FIGS. 2A-B, 3A-C, 4A-B, and 5A-B are provided as examples of sequestering structures 26. The present invention is not limited to these embodiments.

In some embodiments, the sequestering structure 26 of the present invention may be designed to allow compression waves traveling circumferentially through the pipe wall to arrive before the signal traveling through the sequestering device 26 and liquid. For example, the passage gap 38 of the sequestering structure 26 can be sized such that a compression wave traveling through the sequestering structure 26 and across the liquid in the gap 38 would arrive before a shear wave component of the signal traveling circumferentially through the pipe wall. A sequestering structure of this type can provide an advantageous configuration for signal processing because the shear wave is typically much larger and more non-stationary than the compression wave.

Figure 10:
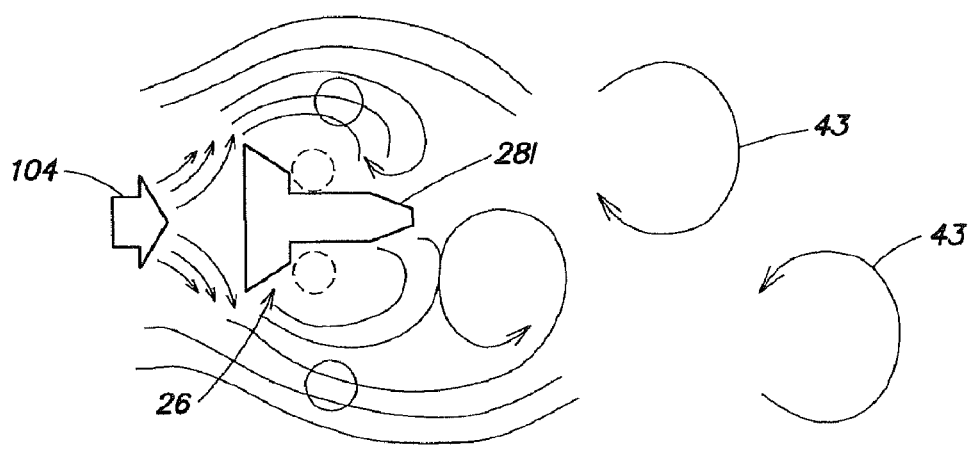
FIG. 10 illustrates a T-shaped sequestering structure member that can also function as part of a vortex meter.

Now referring to FIG. 10, in some embodiments, a sequestering structure member 28I may further function as part of a vortex meter, utilizing a cross-sectional shape that is operable to create vortices 43 within the fluid flow. The sequestering structure member 28I shown in FIG. 10 has a substantially T-shaped cross-section that, when placed within the fluid flow as shown in FIG. 10, creates vortices 43 within the fluid flow 104. Instrumentation (e.g., strain gauges) connected to the member 28I can be used to sense an oscillatory loading experienced by the member 28I as the member sheds vortices within the fluid flow. The frequency of the oscillatory loading of the member 28I can be related to the velocity of the fluid flow. The substantially T-shaped cross-sectional geometry of the sequestering structure member 28I is an example of a cross-sectional geometry that can be used to create vortices 43 within the flow 104. The present invention is not limited to this embodiment.

Figure 8:
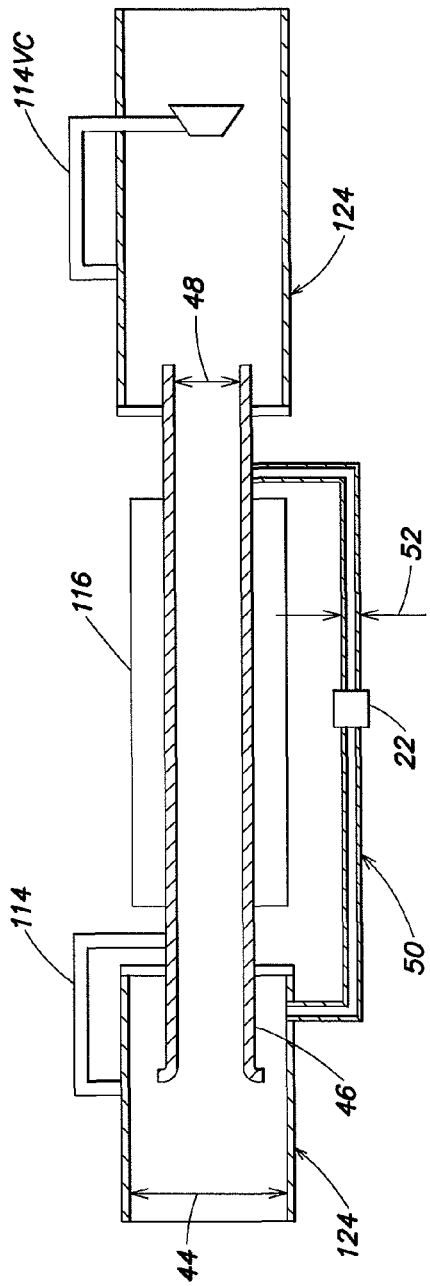
FIG. 8 is a diagrammatic sectional planar view of a three-phase metering device embodiment including a bypass section.

The embodiments diagrammatically shown in FIGS. 6-8 illustrate an apparatus configuration that includes a pipe 124 having a first diameter 44, a nozzle section 46 having a second pipe diameter 48, and a bypass pipe section 50 having a third diameter 52. The pipe 124, nozzle section 46, and bypass section 50 are each described as having a "diameter" thereby implying that each has a circular cross-section. The aforesaid sections are not limited to circular cross-section, and the case of a non-circular cross-section the term "diameter" shall mean the distance across the pipe or section in a direction normal to the flow direction, which direction is parallel to the direction being sensed along. In these embodiments, the pipe diameter 44 is greater than the nozzle section diameter 48, and the nozzle section diameter 48 is greater than the bypass section diameter 52. Preferably, the bypass section diameter 52 is less than one-half the pipe diameter 44.

In these embodiments, the bypass section 50 is sized to provide a diameter 52 (i.e., a passage 24) normal to the flow 104 that is favorable for ultrasonic sensing. In relative terms, the diameter 52 normal to the flow 104 within the bypass section 50 is much smaller than the pipe diameter 44. Consequently, the signal traversing the flow 104 within the bypass section 50 is subject to much less attenuation than would be experienced by a signal traversing the pipe 124 or nozzle section 46.

As indicated above, the ability of the present invention apparatus to sequester an amount of the liquid component of the fluid flow 104 facilitates the determination of the water cut of the liquid. The water cut determination, in turn, permits three-phase metering of the fluid flow without the need to completely separate the liquid phase from the gas phase.

The embodiments shown in FIGS. 2A-B and 4A-B diagrammatically illustrate three-phase metering devices that include a sequestering structure disposed within the pipe. Each of these embodiments includes a flow meter 116 positioned to sense fluid flow through the pipe 124 or the nozzle 46, and a DP meter 114, both of which meters are described in detail above. In FIG. 2A, the flow meter 116 is positioned upstream of the sequestering structure 26. Alternatively, the flow meter 116 may be disposed downstream of the sequestering structure 26. The DP meter 114 in FIG. 2A is positioned to determine the difference in pressure between the pipe 124 and the region either within the sequestering structure passage 24, or in the pipe 124 adjacent to the sequestering structure 26. The embodiment shown in FIG. 4B includes a DP meter 114 positioned to determine the difference in pressure within the pipe 124 across the sequestering structure 26. These embodiments are examples of three-phase metering configurations that include a water cut device 22 positioned to sense a sequestered liquid flow within a pipe. The present invention is not limited to these examples.

The embodiments shown in FIGS. 6-8 diagrammatically illustrate three-phase metering devices that include a bypass section 50 for sequestering an amount of the liquid component of the fluid flow 104. Each of these embodiments includes a flow meter 116 positioned to sense fluid flow through the nozzle section 46 and a DP meter 114, both of which meters are described in detail above. The embodiment shown in FIG. 6 includes a second flow meter 117 positioned to sense the liquid flow through the bypass section 50. The DP meter 114 in FIG. 6 is positioned to determine the difference in pressure between the pipe 124 and the nozzle section 46. The embodiment shown in FIG. 7 includes a v-cone type DP meter 114VC disposed within the pipe 124 upstream of the nozzle section 46. The embodiment shown in FIG. 8 includes a DP meter 114 positioned to determine the difference in pressure between the pipe 124 and the nozzle section 46, and a v-cone type DP meter 114VC disposed within the pipe 124 downstream of the nozzle section 46. These embodiments are examples of three-phase metering configurations that include a water cut device 22 positioned to sense a sequestered liquid flow within a bypass section 50. The present invention is not limited to these examples.

Figure 9:
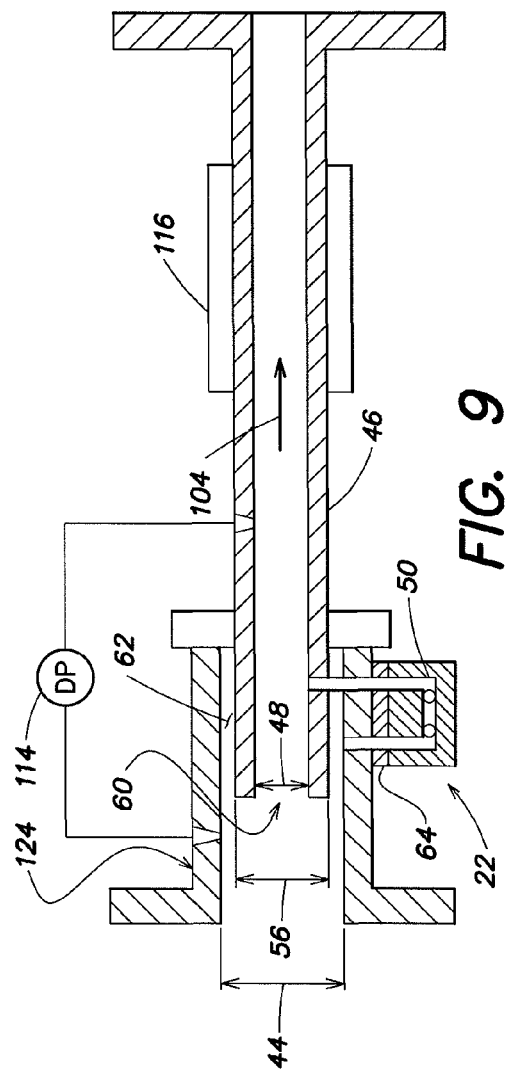
FIG. 9 is a diagrammatic sectional planar view of a three-phase metering device embodiment.

FIG. 9 illustrates another example of a three-phase metering device according to the present invention that includes a pipe 124 and a nozzle section 46. The nozzle section 46 has an inner diameter 48, and an outer diameter 56 that is less than the inner diameter 44 of the pipe 124. This embodiment further includes a flow meter 116 operable to determine the volumetric flow rate within the nozzle section 46, a DP meter 114 positioned to sense a difference in pressure between the pipe 124 and the nozzle section 46, and a water cut device 22 positioned to sense sequestered liquid flow. The flow meter 116 and the DP meter 114 are described in detail above. The nozzle section 46 includes an entry portion 60 that extends into the pipe 124. The difference between the outer diameter 56 of the nozzle section 46 and the inner diameter 44 of the pipe 124 creates an annular region 62 that sequesters the liquid component of the fluid flow 104. The water cut device 22 is positioned to sense liquid within a flow channel 50 extending between the annular region 62 and the nozzle section 46. The difference in fluid flow pressure between the pipe 124 and the nozzle section 46 provides the motive force to move liquid through the water cut flow channel 50. The water cut device 22 may be mounted on an isolation block 64 that enables the water cut device 22 to be removed while fluid flow 104 is passing within the pipe 124 and nozzle section 46.

The three-phase metering devices diagrammatically illustrated in FIGS. 2A-B, 4A-B, and 6-9 all provide the ability to determine the gas and liquid volumetric flow rates, and the flow rates of the constituents (e.g., water and oil) within the liquid component of the fluid flow 104. These devices enable the water cut determination in a variety of different flow conditions and provide structure that creates a favorable sensing environment. The three-phase metering devices shown in FIGS. 2A-B and 4A-B, in particular, provide advantages including: 1) providing a preferable signal path via one or more waveguides that enable signals sent through the waveguides to be easily distinguished from structural borne signal components traveling within the pipe 124; 2) leveraging the propensity of liquid within the fluid flow to travel contiguous with the inner surface of the pipe 124, which fluid is sequestered to provide a liquid continuous body within the passage 24; and 3) providing a relatively short distance for the signal to traverse the liquid during the sensing within the passage 24, and thereby decreasing the amount of signal attenuation relative to a path across the entire diameter of the pipe.

While a number of preferred embodiments have been described herein, any combination of the features described herein may be used. It should be understood that, unless stated otherwise herein, any of the features, characteristics, alternatives or modifications described regarding a particular embodiment herein may also be applied, used, or incorporated with any other embodiment described herein. For example, it is described above that a preferred method for determining the water cut of the liquid within the fluid flow involves the use of an ultrasonic sensor, which sensor includes a transmitter and a receiver. The present invention is not limited to the use of an ultrasonic sensor, however, and may use other means for launching and detecting compression waves across the liquid. As an example, a simple mechanical source operable to create compression waves could be disposed on one side of the sequestering structure and a receiver disposed on the opposite side. The transit time of the signal in such an arrangement could be measured by a device such as a strain gauge operable to sense the compression wave (e.g., the strain gauge is used to sense one or both of the initiation of the compression wave and the arrival of the same). In fact, such a pulse approach may provide desirable insight into the dispersive characteristics of the liquid.

As another example, the sequestering structure is described above as being "disposed within a pipe section". The sequestering structure may alternatively be formed within an independent unit that can be disposed in line within a piping arrangement. Furthermore, the sequestering structure may be inserted into the internal passage of an existing piping section via an existing, or through a later formed, port disposed in the existing piping section. In such applications, the sequestering structure can be readily applied to existing piping structures with minimal alteration.

As yet another example, the present invention is discussed in terms of measuring the transit time of an ultrasonic signal (or other waveform) to determine the speed of sound within the liquid, and using the speed of sound value to subsequently determine the water cut value of the liquid. There may be applications wherein the speed of sound is the sought after liquid characteristic. Consequently, the present invention may be used to determine the speed of sound, without the further determination of a water cut value. It should also be understood that the drawings herein are not drawn to scale.

Although the invention has been described and illustrated with respect to exemplary embodiments thereof, the foregoing and various other additions and omissions may be made therein and thereto without departing from the spirit and scope of the present invention.

What is claimed is:

1. An apparatus for determining the water cut value of a multi-phase fluid flowing within a pipe, which pipe has a wall, the device comprising:
   a sequestering structure disposed within the pipe, having a first member extending out from a first section of the wall, which first member at least partially defines a sensing passage within the pipe, which sensing passage has a gap extending substantially normal to a direction of fluid flow within the pipe, and which sensing passage is oriented to sequester an amount of a liquid component of the multi-phase fluid sufficient to extend across the gap of the sensing passage;
   a transmitting device operable to transmit an ultrasonic signal through the liquid across the gap of the sensing passage;
   a receiving device operable to receive the ultrasonic signal after the ultrasonic signal has traversed the liquid within the sensing passage, and create sensor data; and
   a processing device in communication with at least the receiving device to receive and process the sensor data to determine the water cut value of the liquid.

2. The apparatus of claim 1, wherein the receiving device is mounted on a second section of the pipe wall and aligned substantially opposite the first member.

3. The apparatus of claim 2, wherein the sensing passage is formed between an end surface of the first member and the second section of the pipe wall disposed substantially opposite the first member.

4. The apparatus of claim 3, wherein the transmitting device is mounted relative to the first member to permit the ultrasonic signal to travel through the first member prior to the ultrasonic signal traversing the sensing passage.

5. The apparatus of claim 4, wherein the transmitting device is mounted within the first member.

6. The apparatus of claim 4, wherein the transmitting device is mounted relative to the first member outside of the pipe, and the first member extends through the pipe wall.

7. The apparatus of claim 1, wherein the sequestering structure includes a second member extending out from a second section of the pipe wall substantially opposite the first section of the pipe wall, which second member extends in a direction toward the first member, and the sensing passage is formed between the first and second members.

8. The apparatus of claim 7, wherein the sensing passage is formed between an end surface of the first member and an end surface of the second member, and the end surfaces are planar and parallel with one another.

9. The apparatus of claim 7, wherein the first and second members each include a ramp portion extending between the wall and the sensing passage, wherein for each member the ramp portion is disposed upstream of the sensing passage and extends out from the wall to form an acute included angle between the ramp portion and the wall.

10. The apparatus of claim 7, wherein the receiving device is mounted relative to the second member such that at least a portion of the ultrasonic signal arrives at the receiving device after traveling through the second member and the sensing passage.

11. The apparatus of claim 10, wherein the transmitting device is mounted relative to the first member to permit the ultrasonic signal to travel through the first member prior to the ultrasonic signal traversing the sensing passage.

12. The apparatus of claim 10, wherein the transmitting device is mounted within the first member.

13. The apparatus of claim 12, wherein the receiving device is mounted within the second member.

14. The apparatus of claim 10, wherein the transmitting device is mounted outside of the pipe, in communication with the first member.

15. The apparatus of claim 14, wherein the receiving device is mounted outside of the pipe, in communication with the second member.

16. The apparatus of claim 1, wherein the first member is operable to act as a waveguide for ultrasonic signals transmitted by the transmitting device, and provides a path for the ultrasonic signals to the receiving device that can be traversed in less time than similar waveforms of the ultrasonic signal would take traveling a path from the transmitting device to the receiving device through the pipe wall.

17. The apparatus of claim 16, wherein the first member comprises substantially the same material as the pipe.

18. The apparatus of claim 1, wherein the first member extends a distance into an interior region of the pipe an amount great enough such that a first ultrasonic signal component transmitted from the transmitting device will travel through the first member, traverse the sensing passage, and be sensed by the receiving device, in less time than a second ultrasonic signal component transmitted from the transmitting device at the same time as the first ultrasonic signal component, traveling through the pipe wall from the transmitting device to the receiving device, where the first and second ultrasonic signal components are of the same waveform.

19. The apparatus of claim 18, wherein the pipe and the first member comprise a steel material and the gap of the sensing passage is substantially equal to or less than $\Delta X_{max}$, wherein $\Delta X_{max}$ is defined by the relationship:

$$\frac{\Delta X_{max}}{D} = \frac{\frac{\pi}{2} - 1}{\frac{a_{steel}}{a_{fluid}} - 1}$$

wherein D is a diameter of the pipe, $a_{steel}$ is a speed of sound value for the steel material, and $a_{fluid}$ is a speed of sound value for the multi-phase fluid.

20. The apparatus of claim 1, wherein the first member has a cross-sectional shape that causes the formation of vortices within the fluid flow.

21. The apparatus of claim 1, wherein the sequestering structure is selectively attachable to a port disposed within the pipe, and the first member extends into an internal passage within the pipe to at least partially define a sensing passage within the pipe.

22. The apparatus of claim 21, wherein the sequestering structure includes a second member selectively attachable to a second section of the pipe wall substantially opposite the first section of the pipe wall, which second member extends into the internal passage in a direction toward the first member, and the sensing passage is formed between the first and second members.

23. The apparatus of claim 22, wherein the sensing passage is formed between an end surface of the first member and an end surface of the second member, and the end surfaces are planar and parallel with one another.

24. A method for determining the water cut value of a multiphase fluid flowing within a pipe, comprising the steps of:
sequestering an amount of a liquid component of the multiphase fluid sufficient to form a continuous liquid body across a gap of a sensing passage disposed within the pipe, which sensing passage is formed at least in part by a sequestering structure extending out from a wall of the pipe, and which sensing passage gap extends substantially normal to a direction of fluid flow within the pipe;
transmitting an ultrasonic signal through the liquid across the gap of the sensing passage;
receiving the ultrasonic signal after the ultrasonic signal has traversed the liquid within the sensing passage, and creating sensor data using the ultrasonic signal; and
processing the sensor data to determine the water cut value of the liquid.

25. The method of claim 24, wherein the sensing passage is formed between an end surface of the sequestering structure and a section of the pipe wall substantially opposite the sequestering structure.

26. The method of claim 25, wherein the sequestering structure extends a distance into an interior passage of the pipe an amount great enough such that a first ultrasonic signal component transmitted from a transmitting device will travel through the sequestering device, traverse the sensing passage, and be sensed by a receiving device, in less time than a second ultrasonic signal component transmitted from the transmitting device at the same time as the first ultrasonic signal component, traveling circumferentially through a wall of pipe from the transmitting device to the receiving device, where the first and second ultrasonic signal components are of the same waveform.

27. The method of claim 24, wherein the sequestering structure includes a first member and a second member extending out from the pipe wall, and the sensing passage is formed between the first and second members.

28. The method of claim 27, wherein the ultrasonic signal is transmitted through the first member, across the sensing passage, and received after traversing the second member.

29. The method of claim 28, wherein the first and second members act as waveguides for the ultrasonic signal, and provide a first path between a transmitting device and a receiving device that can be traversed by a waveform of the ultrasonic signal in less time than would take a similar waveform of the ultrasonic signal to traverse a second path from the transmitting device to the receiving device through the pipe wall.

30. The method of claim 29, wherein the first and second members comprise substantially the same material as the pipe.

31. The method of claim 24, wherein the sequestering structure is shaped to create vortices within the fluid flow.

32. A method for determining the water cut value of a multiphase fluid flowing within a pipe, comprising the steps of:

sequestering an amount of a liquid component of the multiphase fluid sufficient to form a continuous liquid body across a gap of a sensing passage disposed within the pipe, which sensing passage is formed at least in part by a sequestering structure extending out from a wall of the pipe, and which sensing passage gap extends substantially normal to a direction of fluid flow within the pipe, and wherein the sequestering structure is shaped to create vortices within the fluid flow;

transmitting an ultrasonic signal through the liquid across the gap of the sensing passage;

receiving the ultrasonic signal after the ultrasonic signal has traversed the liquid within the sensing passage and creating sensor data using the ultrasonic signal;

processing the sensor data to determine the water cut value of the liquid; and determining the velocity of the fluid flow by sensing oscillatory movement of the sequestering structure.

* * * * *